United States Patent
Okada

(10) Patent No.: US 8,456,566 B2
(45) Date of Patent: Jun. 4, 2013

(54) OPTICAL APPARATUS WITH UNIT FOR CORRECTING BLUR OF CAPTURED IMAGE CAUSED BY DISPLACEMENT OF OPTICAL APPARATUS IN OPTICAL-AXIS DIRECTION

(75) Inventor: Kouji Okada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 12/855,594

(22) Filed: Aug. 12, 2010

(65) Prior Publication Data

US 2010/0302387 A1 Dec. 2, 2010

Related U.S. Application Data

(62) Division of application No. 11/957,263, filed on Dec. 14, 2007, now Pat. No. 7,907,205.

(30) Foreign Application Priority Data

Dec. 20, 2006 (JP) ................... 2006-343430

(51) Int. Cl.
 *H04N 5/232* (2006.01)
 *H04N 5/228* (2006.01)
 *H04N 5/335* (2011.01)
 *H04N 5/235* (2006.01)
 *G03B 17/00* (2006.01)

(52) U.S. Cl.
 USPC ...... 348/345; 348/208.99; 348/296; 348/297; 348/362; 396/52

(58) Field of Classification Search
 USPC ........ 348/345, 208.99, 296, 297, 362; 396/52
 See application file for complete search history.

(56) References Cited

U.S. PATENT DOCUMENTS

| | | | | |
|---|---|---|---|---|
| 5,649,237 | A * | 7/1997 | Okazaki | 396/55 |
| 6,181,875 | B1 * | 1/2001 | Hamada et al. | 396/55 |
| 7,564,483 | B2 * | 7/2009 | Uenaka | 348/208.99 |
| 2007/0296829 | A1 * | 12/2007 | Nakamura et al. | 348/229.1 |

* cited by examiner

*Primary Examiner* — Chieh M Fan
*Assistant Examiner* — Quang Le
(74) *Attorney, Agent, or Firm* — Canon USA Inc IP Division

(57) ABSTRACT

A focus range is determined on the basis of an object distance, focal distance, and aperture value, after an autofocus operation. When SW2 is operated, an exposure is performed only during a period that a displacement of a blur in an optical-axis direction is within the focus range. If an exposure time for one exposure does not reach an exposure time to obtain an optimum exposure, a plurality of exposures are performed until a total exposure time reaches the exposure time to obtain the optimum exposure. When the plurality of exposures are performed, a plurality of images obtained are combined to generate an image with the optimum exposure.

5 Claims, 13 Drawing Sheets

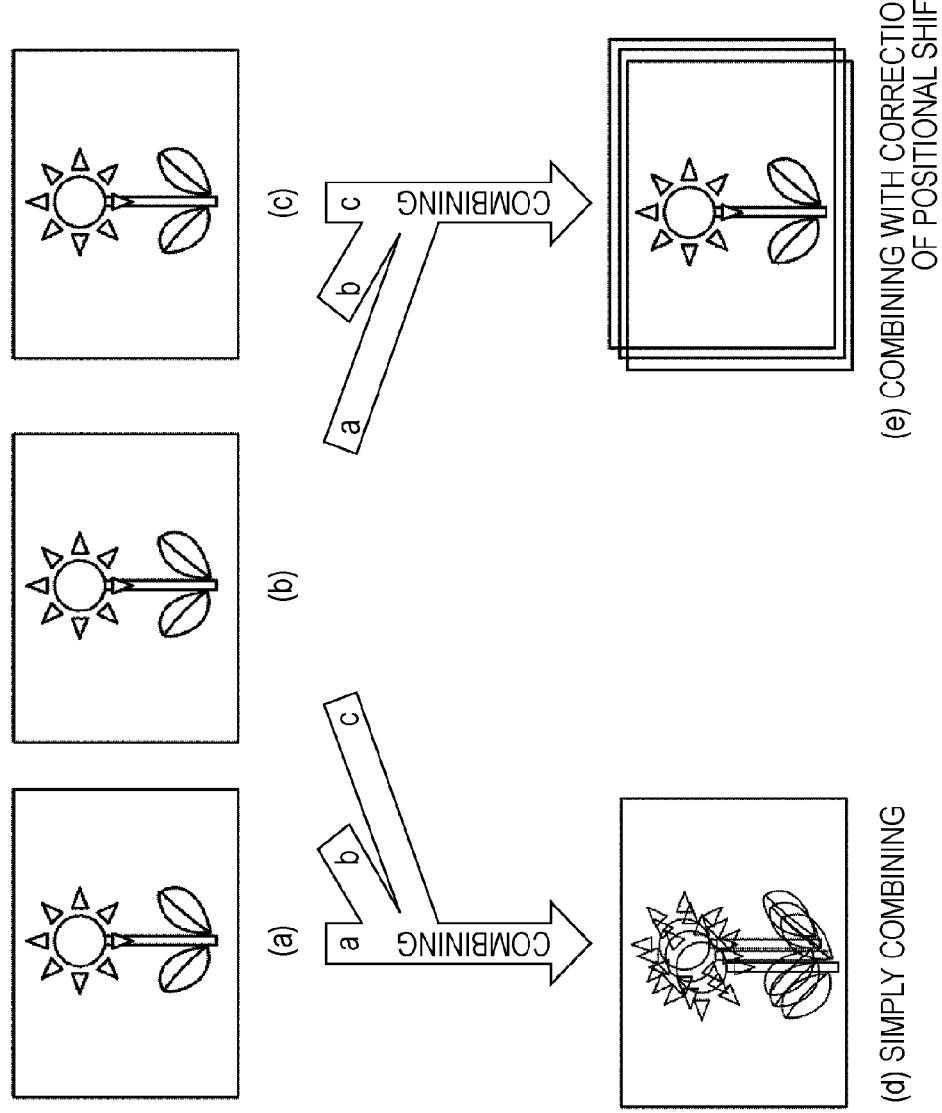

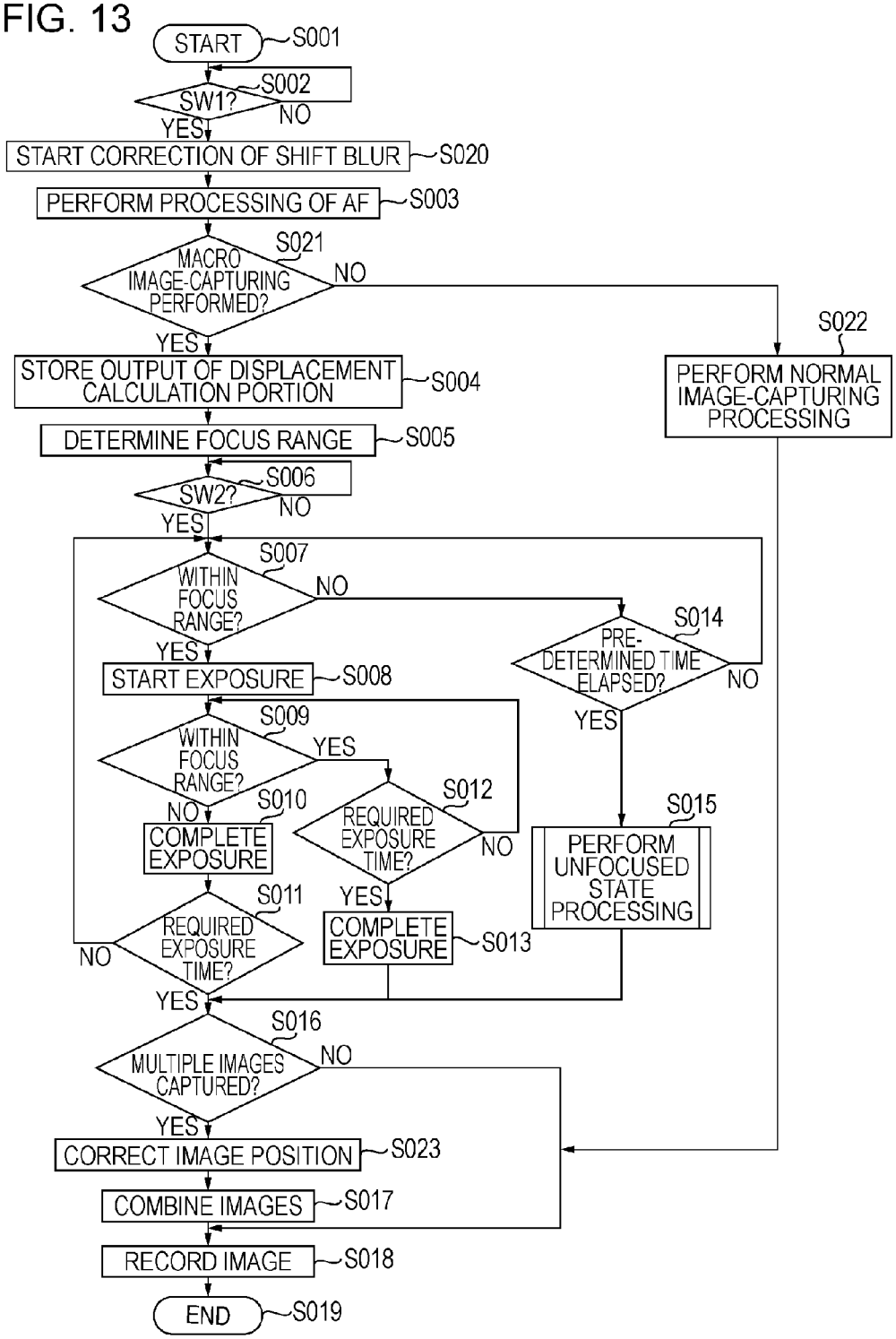

OPTICAL APPARATUS WITH UNIT FOR CORRECTING BLUR OF CAPTURED IMAGE CAUSED BY DISPLACEMENT OF OPTICAL APPARATUS IN OPTICAL-AXIS DIRECTION

The present application is a divisional of U.S. patent application Ser. No. 11/957,263, filed Dec. 14, 2007, entitled "OPTICAL APPARATUS WITH UNIT FOR CORRECTING BLUR OF CAPTURED IMAGE CAUSED BY DISPLACEMENT OF OPTICAL APPARATUS IN OPTICAL-AXIS DIRECTION", the content of which is expressly incorporated by reference herein in its entirety. Further, the present application claims priority from Japanese Patent Application No. 2006-343430, filed Dec. 20, 2006, which is also hereby incorporated by reference herein in its entirety.

BACKGROUND OF THE INVENTION

1. Field of the Invention

The present invention relates to a technique of improving deterioration of a captured image caused by hand shake during image captured by an optical apparatus such as a digital camera. In particular, the present invention relates to a technique of reducing image blurring caused, for example, by hand movement in the optical-axis direction during macro image-capturing.

2. Description of the Related Art

An optical apparatus such as a camera or an interchangeable lens is often provided with an image stabilizer that improves an image blur caused by hand-induced shake or the like.

The hand-induced shake is a vibration normally having a frequency ranging from 1 to 10 Hz. The image stabilizer mainly corrects image blurring caused by vibrations having such a frequency. For image stabilization, the vibration of the optical apparatus is detected. Then, a technique like optical image-stabilization or electronic image-stabilization is used. Optical image-stabilization shifts a correction lens in a plane orthogonal to the optical axis in accordance with the detected vibration. The electronic image-stabilization varies an area, from which data is output as an image, from within the total pixel area of the imaging element.

If the image-capturing magnification is 0.1 or lower, in general, image blurring can be reliably corrected only by correcting an angular blur in a direction in which the image pickup surface tilts. If the image-capturing magnification is higher than 0.1, the effect of blurring in a parallel direction, i.e., in vertical and horizontal directions (hereinafter, referred to as a shift blur), and the effect of blurring in the optical-axis direction (hereinafter, referred to as a focus blur) may increase. FIG. 1 is a graph showing the effects of the blurs. FIG. 1 plots image-capturing magnification in the x direction and displacement of the image in an image plane due to blurring in the y direction.

To improve (i.e. reduce) the blurs in an optical apparatus having a high image-capturing magnification such as a macro lens, a technique has been proposed that detects a shift blur and a focus blur with an acceleration sensor or the like, and drives and controls a correction system on the basis of the detection output (see Japanese Patent Laid-Open No. 09-080523).

The above-mentioned electronic image-stabilization is frequently used in apparatus for recording movies, such as a video camera.

In the field of still images, a technique has been proposed in which a plurality of underexposure images are captured at a shutter speed which is hardly affected by hand shake, positional shifts among the images are then corrected, and the images are combined, so as to reduce the blurring and obtain a still image with an optimum exposure (see Japanese Patent No. 03110797).

With the above technique, since the positional shifts among the images can be acquired using the captured images, a blur detection element such as a vibrating gyroscope is not necessary. Also, since the correction is performed on the basis of a blur signal from the image pickup surface, the above-mentioned shift blur and angular blur do not have to be considered separately.

With both techniques described above, the angular blur and shift blur can be reliably corrected.

However, with the technique of Japanese Patent Laid-Open No. 09-080523, the focus lens is moved in an optical-axis direction to correct the focus blur, causing the following problems.

First, as the focus lens is moved in the optical-axis direction, the angle of field is changed. This is one of the important factors of the deterioration in images when high magnification image-capture such as macro image-capture is performed. If a lens for correcting the angle of field is additionally provided for preventing the deterioration in images, the correction system may become complicated. Further, an existing focus lens driving system for auto-focusing cannot accurately follow the blur because the driving characteristic of a motor is insufficient and the backlash is large. While the technique of Japanese Patent No. 03110797 is effective for a shift blur, the patent does not disclose nor suggest correction of a focus blur.

SUMMARY OF THE INVENTION

The present invention can provide an optical apparatus capable of providing an image having reduced focus blurring caused by hand-induced shake without using an auto-focusing device or a mechanical device for accurately following the blur.

According to an aspect of the present invention an optical apparatus is provided with a lens system having a focus lens and an image pickup element which converts an image formed by the lens system into an image signal. Such an optical apparatus includes a control unit configured to control operation of the apparatus, an auto-focus unit configured to move the focus lens to bring the image into an in-focus state, a displacement detection unit configured to detect a displacement of the optical apparatus in the direction of the optical axis of the lens system, and a focus-range setting unit configured to calculate an acceptable range of detected displacement within which it is assumed that the image remains in an in-focus state. The control unit is operable to capture one or more images in a given time period from the pickup element when the detected displacement is within said acceptable range.

With this aspect of the present invention, a more focused image can be obtained even if a blur in the optical-axis direction seriously affects the image captured.

Another embodiment of the present invention provides an optical apparatus including a taking lens unit arranged to have a focus lens. The apparatus may include an image pickup element including an image pickup element, the image pickup element being arranged to pick up an object image focused on the image pickup element and convert the object image into an image signal; an autofocus unit configured to drive the focus lens to bring the object image on the image pickup element into an in-focus state; an image pickup control unit configured to start image-capturing an object in response to an operation of an image pickup start switch, and to perform control for obtaining the image signal from the image pickup element; a displacement detection unit arranged to output a displacement signal of the optical apparatus in an optical-axis direction; a memory arranged to store an output of the displacement detection unit when the object image is brought into the in-focus state with the autofocus unit; a focus-range setting unit configured to set a focus range within which the object image is assumed to be in-focus accordance with a condition of the taking lens unit, even if the optical apparatus is displaced in the optical-axis direction; and an in-focus state judgment unit configured to judge whether the detected displacement is within the set focus range, in which the image pickup control unit controls the image pickup element in accordance with a judgment result of the in-focus state judgment unit, and obtains a plurality of the converted image signals.

With this aspect of the present invention, the image pickup control unit can control the image pickup element if the judgment result of the in-focus state judgment unit is within the focus range, controls the image pickup element, and obtains an image signal within the focus range.

Further features of the present invention will become apparent from the following description of exemplary embodiments with reference to the attached drawings.

BRIEF DESCRIPTION OF THE DRAWINGS

FIG. 12 is an illustration schematically showing image combining according to the second embodiment of the present invention.

FIG. 13 is a flowchart showing an operation of the second embodiment of the present invention.

DESCRIPTION OF THE EMBODIMENTS

Embodiments of the present invention are now described with reference to the attached drawings.

First Embodiment

Figure 1:
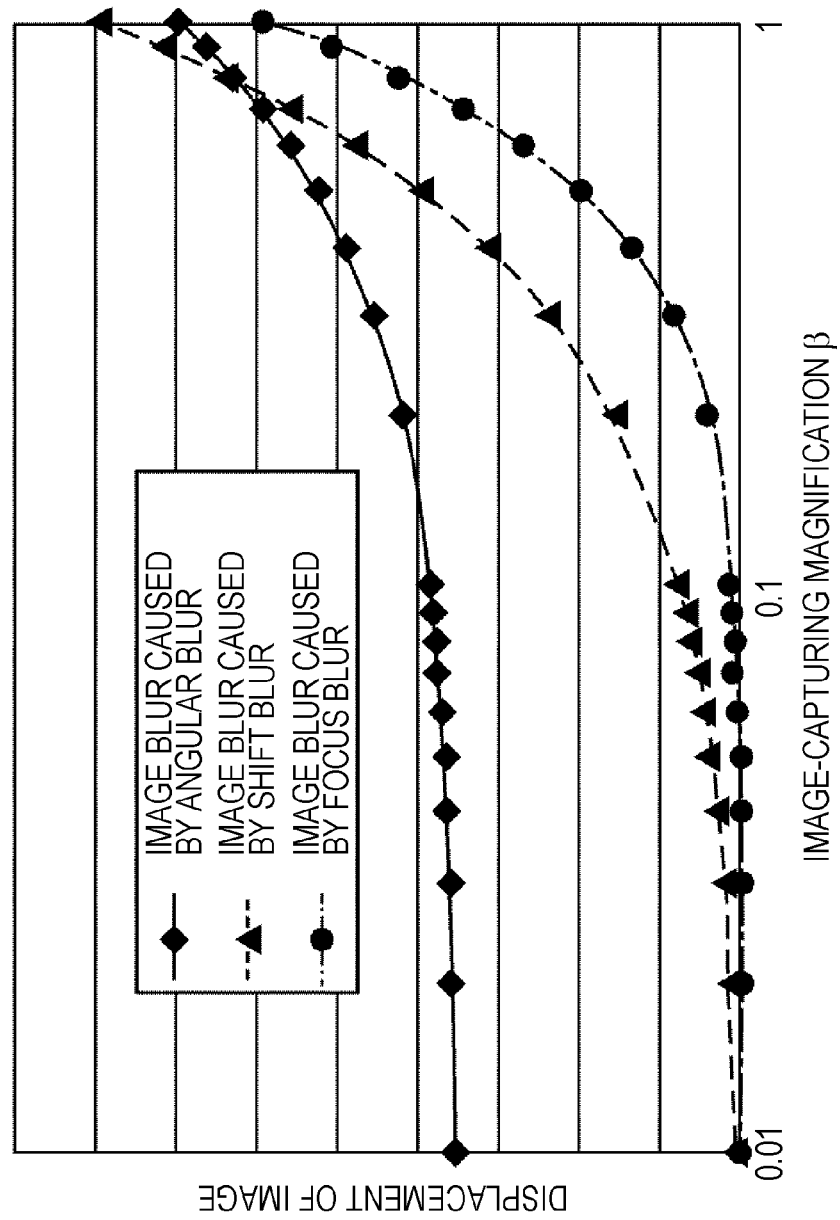
FIG. 1 is a graph showing effects of image-capturing magnifications and motion blurs caused by hand shake to an image plane.
Figure 2:
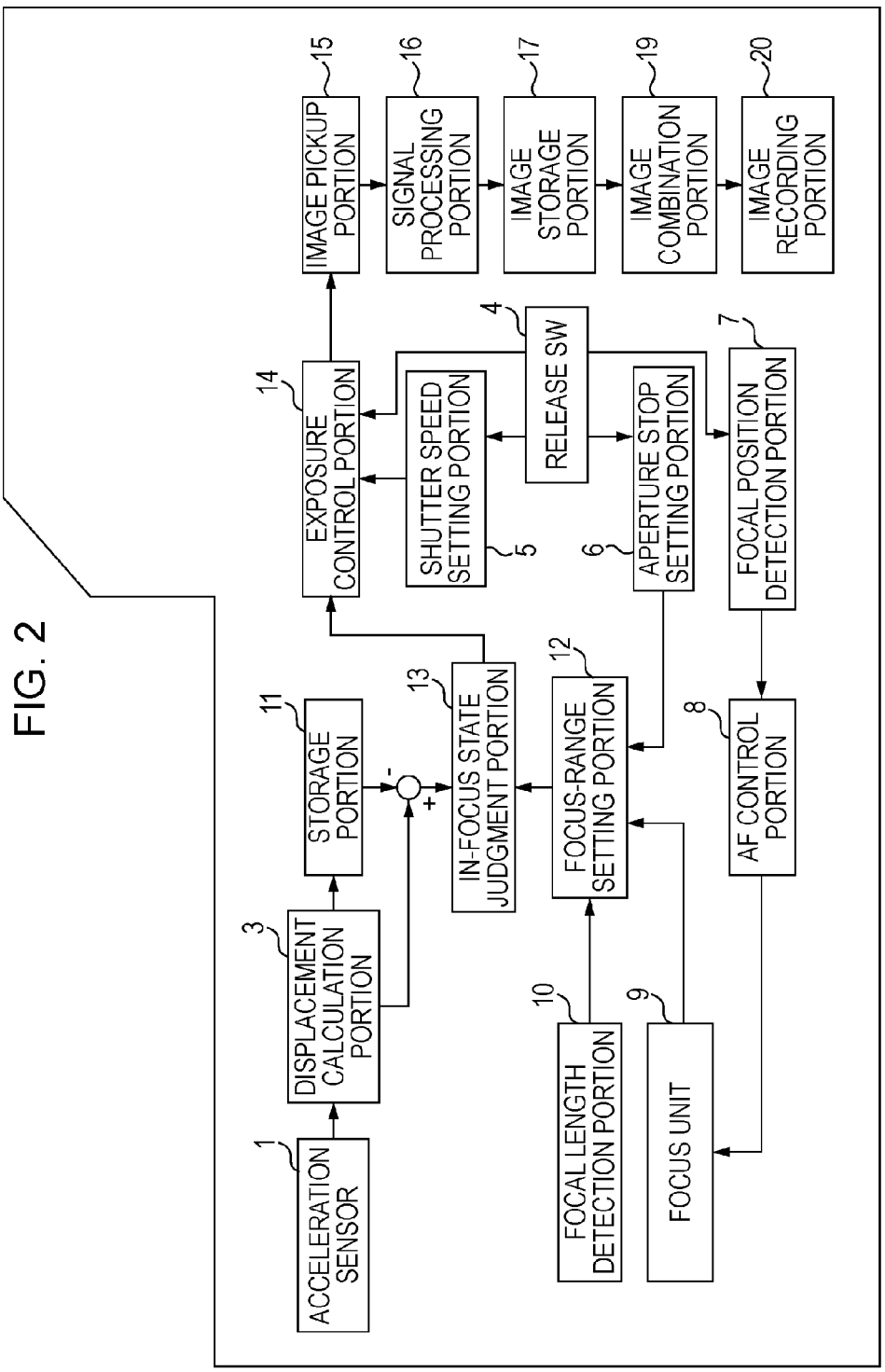
FIG. 2 is a block diagram showing the function of a digital single-lens reflex camera with an interchangeable lens according to a first embodiment of the present invention.

FIG. 2 is a block diagram showing the function of a digital single-lens reflex camera with an interchangeable lens. The camera is an optical apparatus according to a first embodiment of the present invention.

An acceleration sensor 1 detects the acceleration of the camera in an optical-axis direction. A displacement calculation portion 3 calculates the displacement of the blur in the optical-axis direction by applying second-order integration to a signal obtained such that an output of the acceleration sensor 1 is subtracted by a direct-current (DC) component (i.e., electrical DC offset and DC component caused by acceleration due to gravity).

A release switch 4 can be half pressed (SW1) or fully pressed (SW2). A shutter speed setting portion 5 sets the shutter speed when the release switch 4 is half pressed (SW1). An aperture stop setting portion 6 sets the aperture value.

A focal position detection portion 7 detects a focused position of an object. An autofocus (AF) control portion 8 controls an AF operation. A focus unit 9 includes a focus lens and a motor, and serves as an autofocus unit. A focal length detection portion 10 detects a current focal length on the basis of the position of a zoom lens.

A storage portion 11 stores an output of the displacement calculation portion 3 in the in-focus state. A focus-range setting portion 12 sets a focus range within which an object is assumed to be in an in-focus state even if the camera is moved in the optical-axis direction due to hand shake. The range can be set on the basis of the focal length, an object distance obtained on the basis of the position of the focus lens in the in-focus state, and the aperture value set with the aperture stop setting portion 6. An in-focus state judgment portion 13 judges whether the displacement obtained such that the output of the displacement calculation portion 3 is subtracted by an output of the storage portion 11, is within the focus range set with the focus-range setting portion 12.

An exposure control portion 14 allows an exposure to be performed during a period that an object is judged with the in-focus state judgment portion 13 as in an in-focus state when the release switch 4 is fully pressed (SW2). When the in-focus state judgment portion 13 judges that the object is in an unfocused state during the exposure, or when the exposure is continued for a predetermined exposure time set with the shutter speed setting portion 5, the exposure control portion 14 stops or completes the exposure.

An image pickup portion 15 converts the image signal into an electric signal, a signal processing portion 16 acquires the converted image signal as electronic data, and an image storage portion 17 temporarily stores the electronic data, in accordance with a control signal of the exposure control portion 14.

An image combination portion 19, in a case where the image storage portion 17 temporarily stores a plurality of images, combines these images and generates a single output image.

An image recording portion 20 stores the image generated with the image combination portion 19 or an image stored in the image storage portion 17 if a single image is stored, in a nonvolatile storage device.

Next, the relationship between a blur in the optical-axis direction and the exposure is described with reference to FIGS. 3 and 4.

Figure 3:
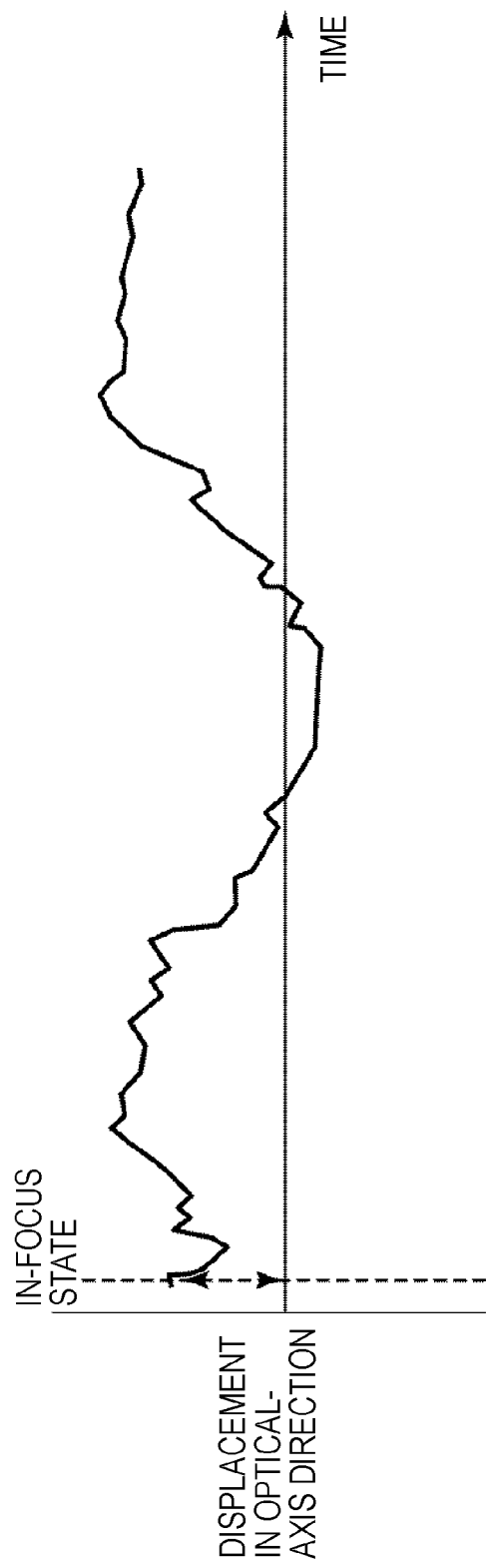
FIG. 3 is a first graph showing the relationship between blur in an optical-axis direction and exposure according to the first embodiment of the present invention.

FIG. 3 plots time in the x direction and displacement in the optical-axis direction in the y direction. It is assumed that the AF operation of the focus unit 9 is completed at the time indicated by the dotted line in FIG. 3, and an object is brought into an in-focus state at that point. The storage portion 11 stores the displacement in the optical-axis direction in the in-focus state.

At the time when the object is brought into the in-focus state, an object distance is determined on the basis of the position of the focus lens. The focus-range setting portion 12 determines a focus range within which an object is assumed to be in an in-focus state on the basis of a currently focused position, in accordance with the object distance, the aperture value determined with the aperture stop setting portion 6, and the current focal length. The focus range is similar to the depth of field, however, is not equivalent thereto. Regarding a time lag or the like for the start or completion of the exposure, it is desirable that the focus range is smaller than the depth of field. To prevent chattering from occurring during the start or completion of the exposure, a hysteresis may be applied to a value of displacement at the start or completion of the exposure within the focus range.

Figure 4:
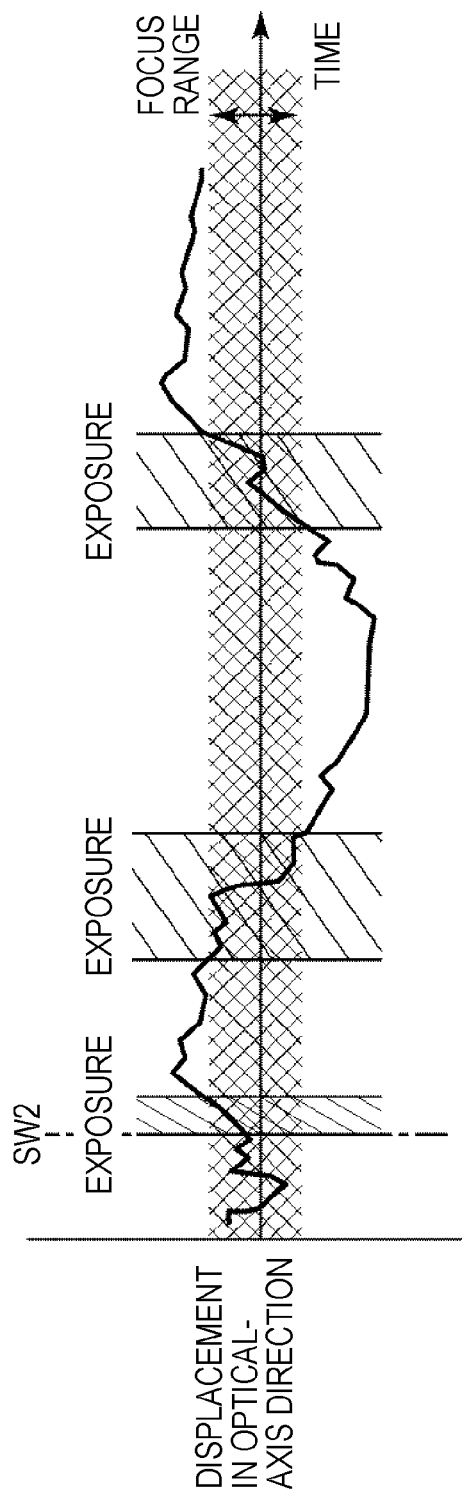
FIG. 4 is a second graph showing the relationship between blur in the optical-axis direction and the exposure according to the first embodiment of the present invention.

FIG. 4 is similar to FIG. 3 and plots time in the x direction and displacement in the optical-axis direction in the y direction. The displacement in the optical-axis direction is subtracted by the displacement in the in-focus state stored in the storage portion 11, namely by an offset, and the value is displayed. In FIG. 4, a range indicated with an arrow and a name of "focus range" is the focus range set with the focus-range setting portion 12. When the release switch 4 is full pressed (SW2) at the time indicated by the dotted-chain line, the exposure is performed only while the displacement is within the focus range, or only during periods indicated by oblique lines in FIG. 4.

Figure 5:
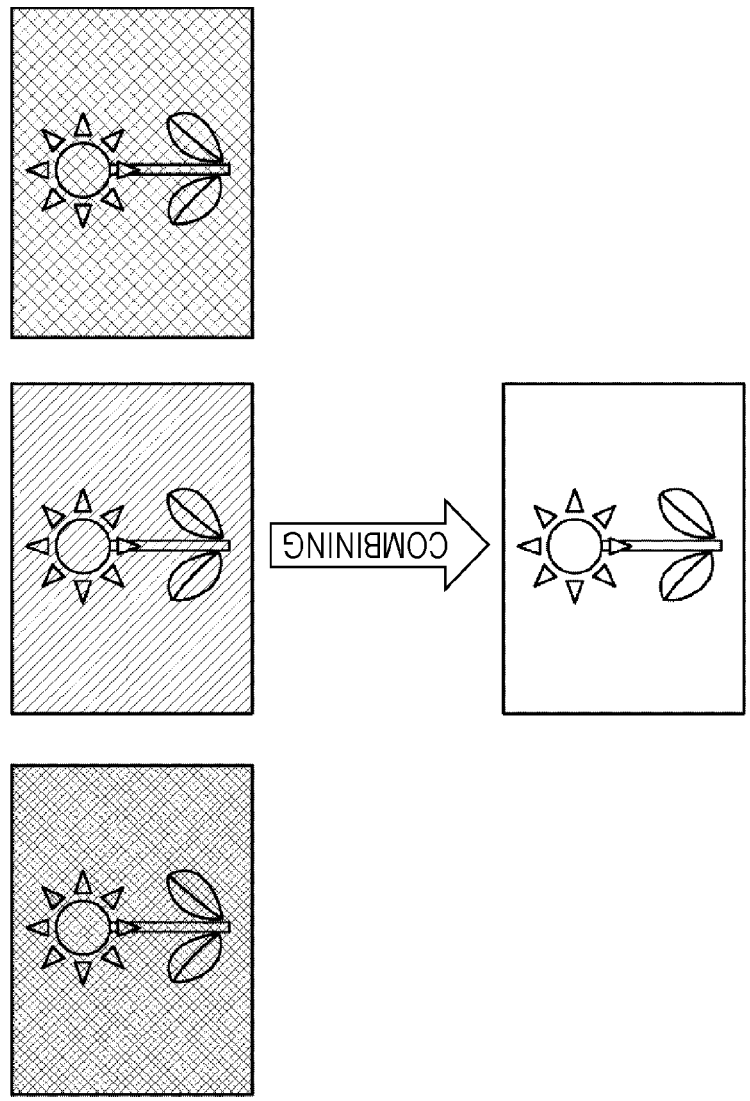
FIG. 5 is an illustration schematically showing image combining according to the first embodiment of the present invention.

FIG. 5 is an illustration showing an operation of combining images obtained by three exposures as shown in FIG. 4, and generating a single image. The exposure control portion 14 determines the number of exposures. The exposures are performed until the total exposure time reaches a predetermined exposure time set with the shutter speed setting portion 5. However, when the in-focus state judgment portion 13 judges that the unfocused state is continued for a given time or more, a different operation is performed. The details of the operation will be described later.

Figure 6:
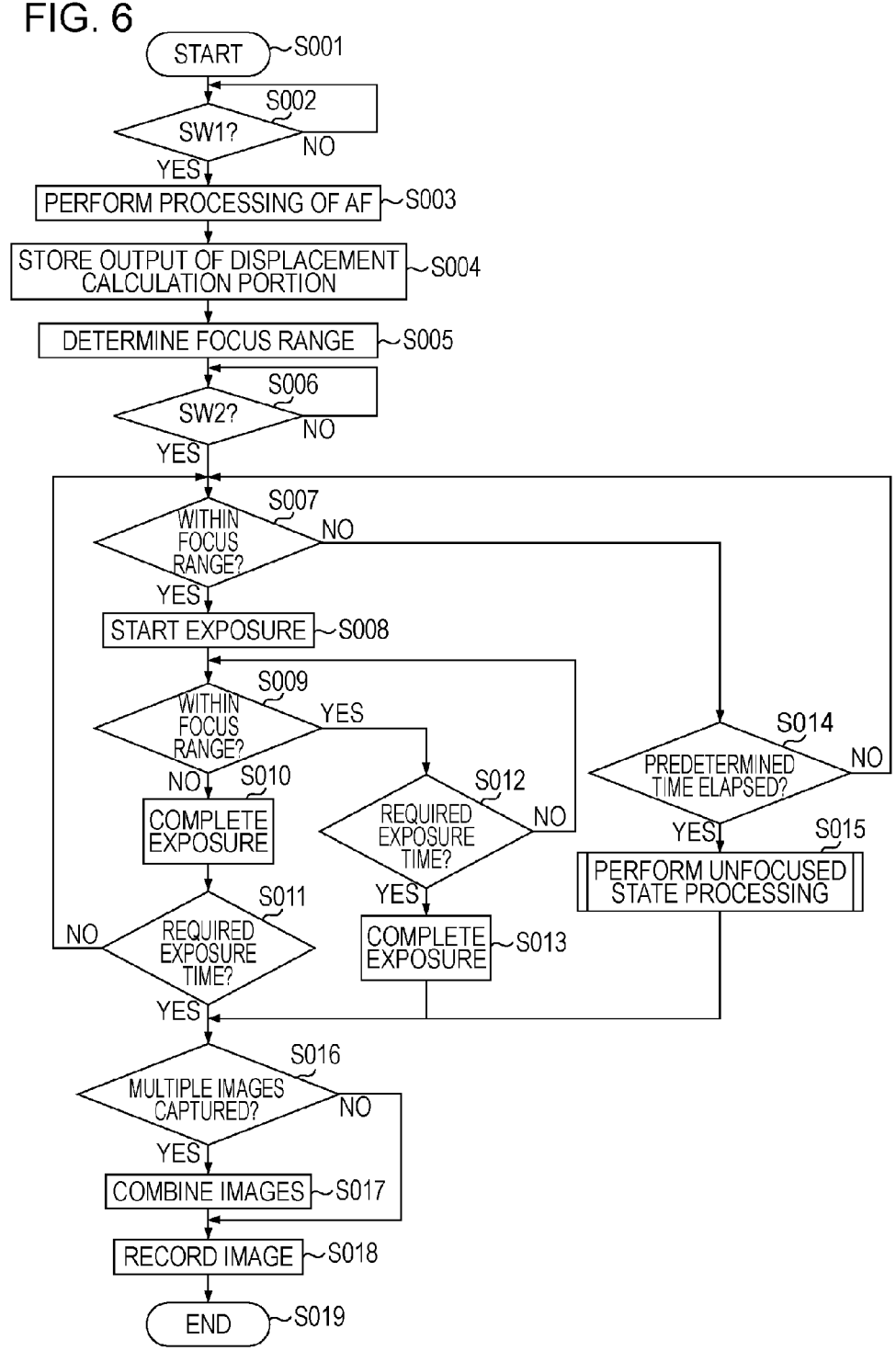
FIG. 6 is a flowchart showing an operation of the first embodiment of the present invention.

FIG. 6 is a flowchart showing the operation of this embodiment. When a user half presses the release switch 4 so as to focus on an object (S002), the focal position detection portion 7 detects the focal point. On the basis of the result of the focal point detection, the AF control portion 8 drives an AF motor disposed in the focus unit 9, so that the lens is stopped at a target focus position. Then, the focal position detection portion 7 detects a focal point again. When it is detected that focal point is in the in-focus state, the AF processing is completed (S003).

Then, the storage portion 11 stores an output of the displacement calculation portion 3 at the completion of the AF processing (S004). Also, the focus-range setting portion 12 determines the focus range within which an object is assumed to be in an in-focus state, on the basis of the object distance, focal length and aperture value, which are optical information at the completion of the AF processing (S005).

When the user fully presses the release switch 4 (S006), the in-focus state judgment portion 13 judges whether the object is currently in the in-focus state (S007). The judgment is made because the object may be in an unfocused state when the camera is moved in the optical-axis direction due to hand shake occurring in a period after the AF processing is completed until the operation of SW2, even if the object has been focused by the AF processing.

If the object is in the unfocused state, it is judged whether the unfocused state has been continued for a given time or more (S014). If the unfocused state has not been continued for the given time or more, the processing returns to step S007 and the judgment is made again. If the unfocused sate has been continued for the given time or more, the processing goes to unfocused state processing. The details of the processing will be described later.

If it is judged that the object is in the in-focus state in step S007, a mirror is moved up and a shutter is opened to start an exposure (S008). The in-focus state judgment portion 13 judges whether the object is in the in-focus state during the exposure (S009). If the in-focus state is continued, it is judged whether the exposure time has reached the predetermined exposure time set with the shutter speed setting portion 5 (S012). The exposure is continued if the exposure has not yet reached the predetermined exposure time, whereas the mirror is moved down and the shutter is closed to complete the exposure if the exposure has been continued for the predetermined exposure time (S013).

If it is determined that the object is "out of the focus range" in step S009, the exposure is completed (S010). Then, it is judged whether the exposure time has reached the predetermined exposure time set with the shutter speed setting portion 5 (S011). If the exposure time has not reached the predetermined exposure time, the processing returns to step S007.

If the total counted exposure time reaches the predetermined exposure time set with the shutter speed setting portion 5, or if the unfocused state processing is finished, it is judged whether a plurality of images have been acquired by a single operation of SW2 in step S016. The image storage portion 17 temporarily stores the acquired images.

If the image stored in the image storage portion 17 is only a single image, the processing goes to step S018, and the image recording portion 20 stores the image in the nonvolatile storage device.

If it is judged that the image stored in the image storage portion 17 is a plurality of images in step S016, the processing goes to step S017, and the image combination portion 19 combines the images. Each of the plurality of images is an image with an underexposure. Combining the plurality of images can generate an image with an optimum exposure. The image recording portion 20 stores the image generated in step S017 in the nonvolatile storage device (S018). After the processing of step S018 is finished, the image temporarily stored in the image storage portion 17 is deleted.

Figure 7:
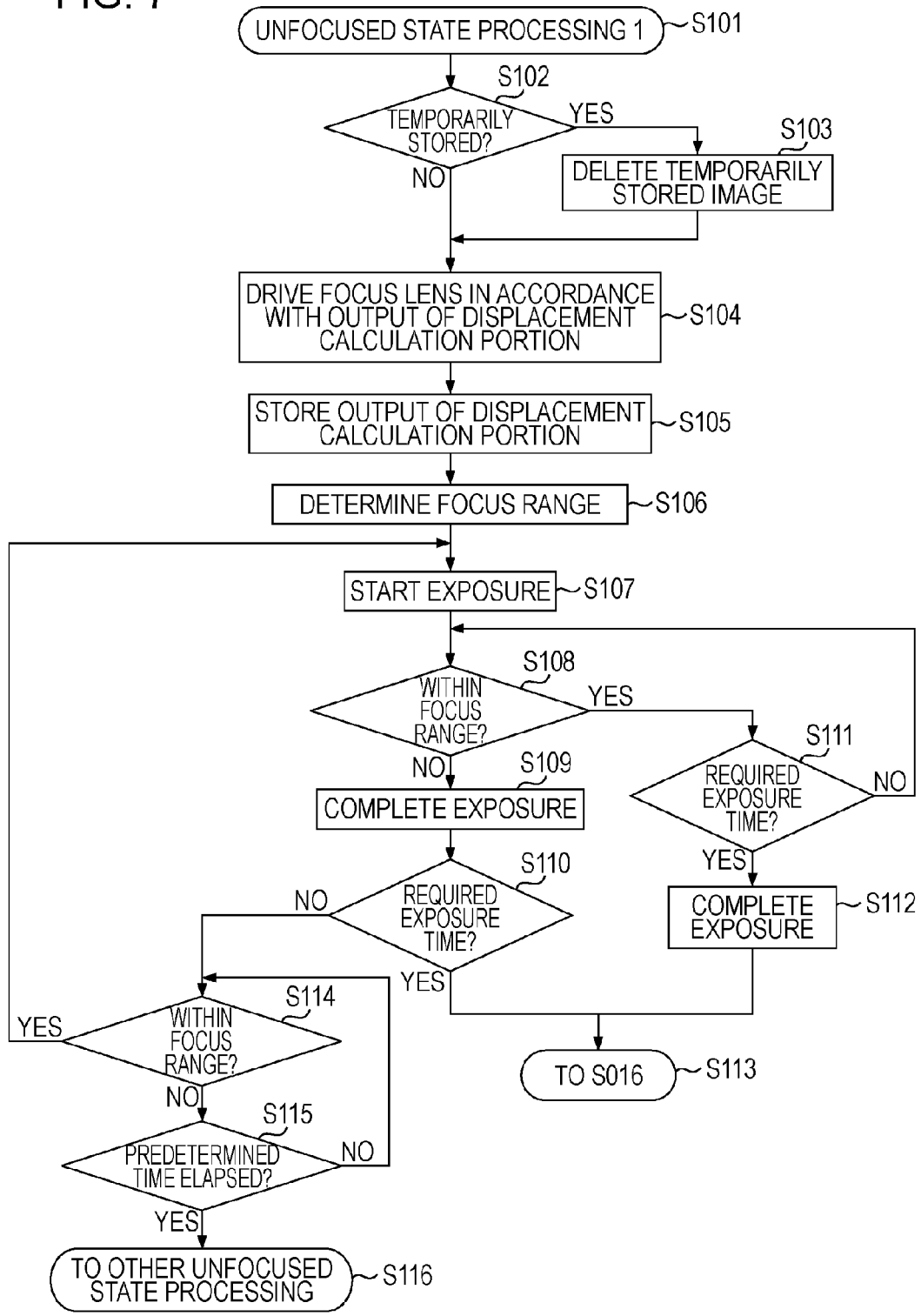
FIG. 7 is a flowchart showing an operation of unfocused state processing 1 according to the first embodiment of the present invention.
Figure 8:
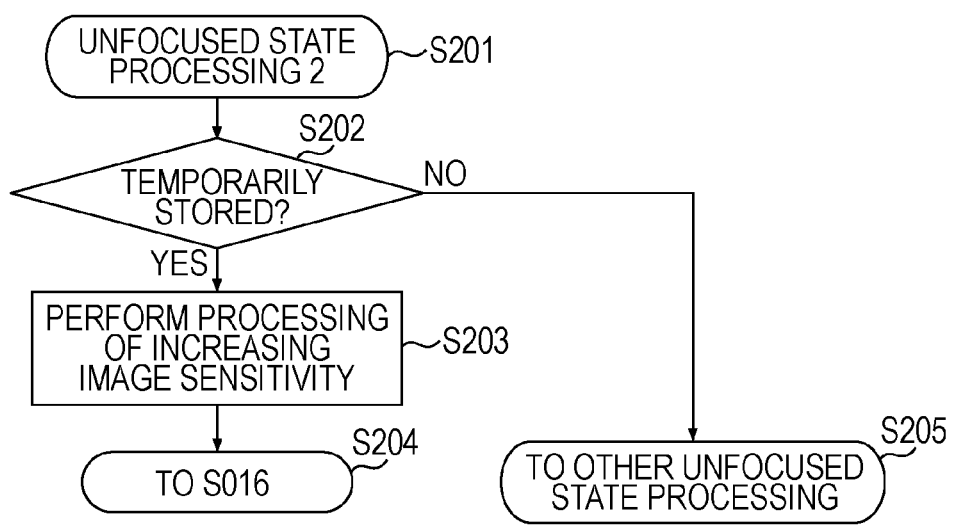
FIG. 8 is a flowchart showing an operation of unfocused state processing 2 according to the first embodiment of the present invention.
Figure 9:
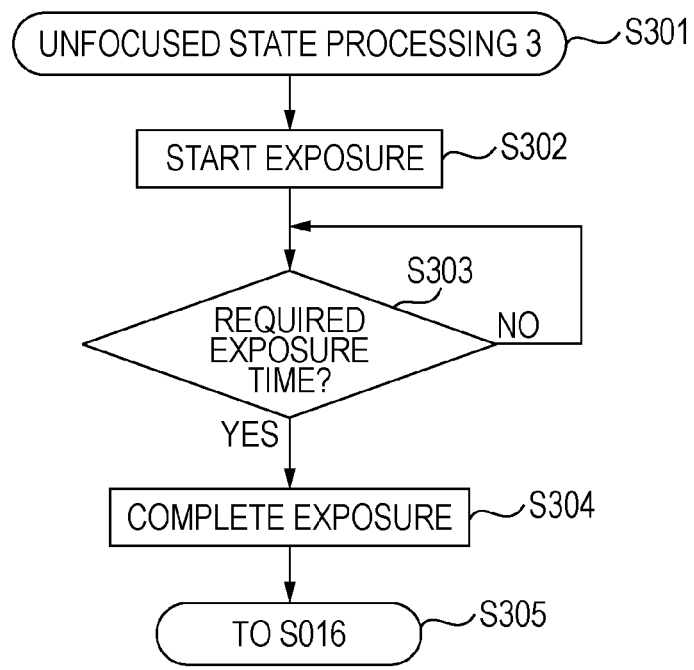
FIG. 9 is a flowchart showing an operation of unfocused state processing 3 according to the first embodiment of the present invention.

FIGS. 7 to 9 are flowcharts showing unfocused state processing. If it is determined that the unfocused state has been continued for the given time or more in step S014 of FIG. 6, unfocused state processing in one of FIGS. 7 to 9 is performed.

In unfocused state processing 1 illustrated by the flowchart in FIG. 7, if the unfocused state has been continued for the given time or more, the focus lens is driven in a direction corresponding to the output of the displacement calculation portion 3, and starts an exposure at the time when the object is in the in-focus state. Hereinafter, the processing is described in time series.

Once the unfocused state processing 1 is started, it is judged whether the image storage portion 17 has temporarily stored the image during a period between the operation of SW2 and the beginning of the processing (S102). If no image has been temporarily stored, the processing goes to step S104.

If an image has been temporarily stored, the temporarily stored image in the image storage portion 17 is deleted (S103), and the processing goes to step S104.

In step S104, the focus lens is driven by an amount corresponding to a lens driving amount calculated on the basis of the output of the displacement calculation portion 3. The output of the displacement calculation portion 3 represents a shift between the position of the camera focused with the operation of SW1 and the current position.

Thus, the driving amount of the focus lens to be moved can be calculated using the output of the displacement calculation portion 3, so that the object is again in the in-focus state.

In step S104, the storage portion 11 stores the output of the displacement calculation portion 3 at the time when driving of the lens is completed (S105). Also, the focus-range setting portion 12 determines the focus range within which the object is assumed to be in the in-focus state, on the basis of the object distance, focal length and aperture value, which are optical information at this time (S106).

While the focus-range setting portion 12 determines the focus range within which the object is assumed to be in the in-focus state on the basis of the three pieces of optical information of the object distance, focal length and aperture value in this embodiment, the focus-range setting portion 12 can determine the focus range within which the object is assumed to be in the in-focus state on the basis of other pieces of information such as an angle of field.

At the time when the above step is completed, the object is in an in-focus state, and hence, an exposure is started (S107). The in-focus state judgment portion 13 continues to determine the existence of the in-focus state during the exposure (S108). If the in-focus state continues, it is determined whether the exposure time has reached the predetermined exposure time set with the shutter speed setting portion 5 (S111). The exposure is continued if the exposure has not been continued for the predetermined exposure time, whereas the exposure is completed if the exposure has been continued for the predetermined exposure time (S112). After the exposure is completed, the processing returns to step S106, and it is judged whether a plurality of images has been acquired with the single operation of SW2.

The exposure is completed if it is determined that the object is out of the focus range in step S108 (S109), and it is judged whether the exposure time has reached the predetermined exposure time set with the shutter speed setting portion 5 (S110). If the exposure time has reached the predetermined exposure time, the processing goes to step S114, and the judgment for the in-focus state is performed. If the object is within the focus range again, the exposure is started again (S107).

If the object is out of the focus range, it is judged whether the unfocused state has been continued for a given time (S115). If the unfocused state has been continued for the given time, the processing returns to step S114, and the judgment for the in-focus state is performed. If the unfocused sate has not been continued for the given time, the unfocused state processing 2 or 3 is performed (S116). Note that the given time may be equivalent to the time used in step S104 in FIG. 6, or may be a different time.

In the unfocused state processing 2 illustrated with the flowchart in FIG. 8, if the unfocused state has been continued for a given time or more, the sensitivity (ISO speed rate) of the acquired image is increased to compensate for underexposure of the image.

Once the unfocused state processing 2 is started, it is judged whether the image storage portion 17 has temporarily stored the image during a period between the ON operation of SW2 and the beginning of the processing (S202). If an image has been temporarily stored, the processing goes to step S203. If no image has been temporarily stored, the unfocused state processing 1 or 3 is performed.

In step S203, if only a single image has been stored in the image storage portion 17, the sensitivity of the image is adjusted to have an optimum brightness. If a plurality of images have been stored, the images are combined into a single image, and then the sensitivity of the image is adjusted to have an optimum brightness.

In the unfocused state processing 3 illustrated with the flowchart in FIG. 9, an exposure is started immediately when the unfocused state has been continued for a given time or more, and is continued until the exposure time reaches a predetermined exposure time.

Once the unfocused state processing 3 is started, an exposure is immediately started (S302), is continued until the exposure time reaches a predetermined exposure time set with the shutter speed setting portion 5 (S303), and when the exposure time reaches the predetermined exposure time, the exposure is completed (S304).

With this embodiment, an image in focus can be obtained even if a blur in the optical-axis direction seriously affects the image captured.

If the in-focus state has not been continued for a given time, the unfocused state processing 3 performs exposure even in the unfocused state. Hence, an image, though having a blur, can be captured. The unfocused state processing 3 prevents unavailability of an image in an in-focus state from being continued.

Also, an underexposure can be compensated by combining images if necessary. A highly accurate mechanism for correcting a focus blur is not necessary, and hence, the camera can be prevented from being increased in size and cost, and from having a complicated structure.

Further, a blur in a direction orthogonal to the optical axis can be reliably corrected by utilizing both optical image-stabilization and electronic image-stabilization.

Second Embodiment

In the above-described first embodiment, the acceleration sensor is used for detection of a focus blur. Also, a blur correction function is arranged for correcting a blur in the direction orthogonal to the optical axis.

In a second embodiment, an acceleration sensor and an angular speed sensor are used for detection of a focus blur. Also, a motion blur optical correction unit and a motion blur electronic correction unit are arranged for correcting a blur in the direction orthogonal to the optical axis.

The second embodiment is described with reference to FIGS. 10 to 13. Like numerals refer like components as in the first embodiment. Also, descriptions of operations similar to those of the first embodiment are omitted. Operations unique to the second embodiment are mainly described.

Figure 10:
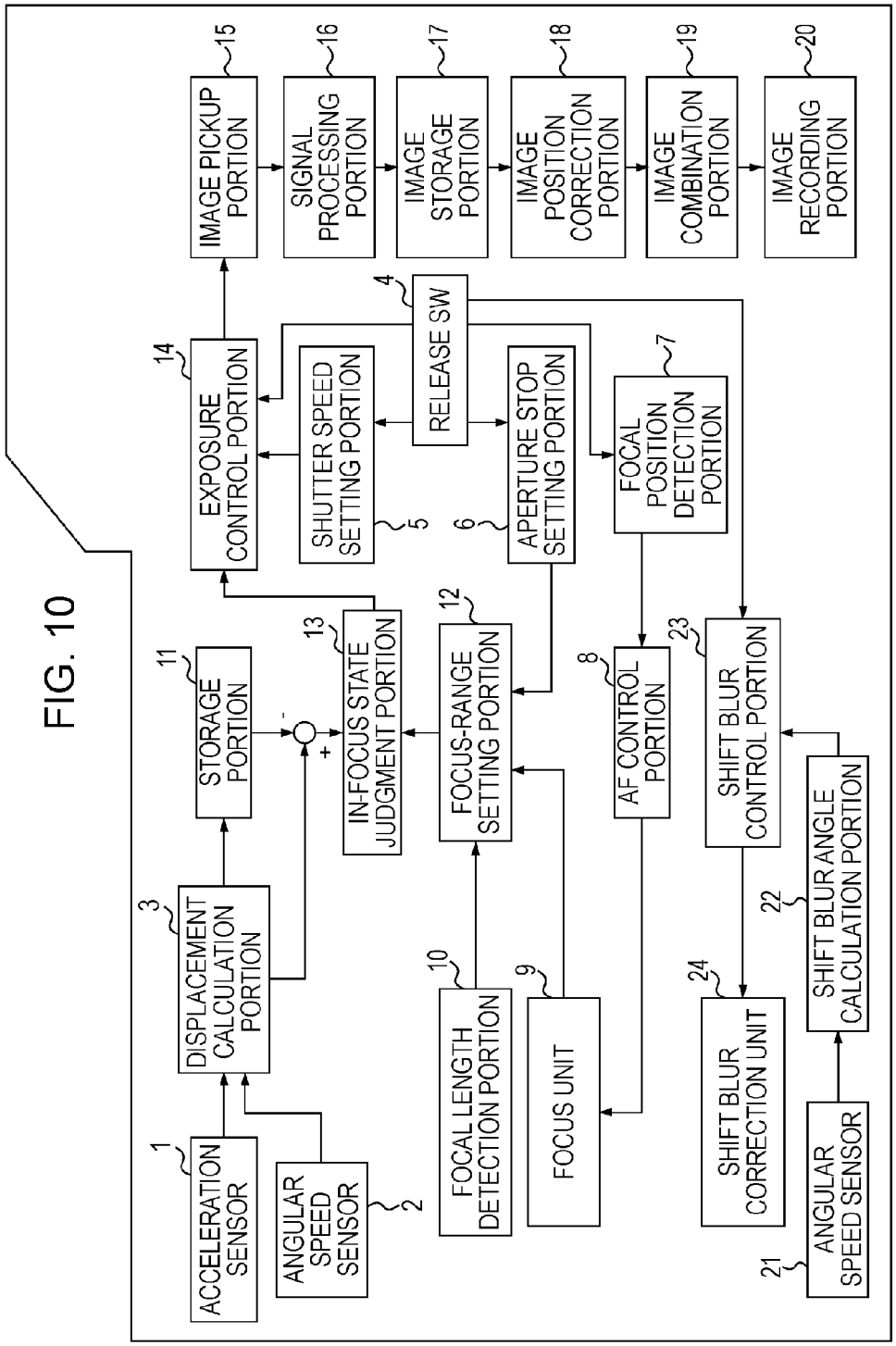
FIG. 10 is a block diagram showing the function of a digital single-lens reflex camera with an interchangeable lens according to a second embodiment of the present invention.

FIG. 10 is a block diagram showing the function of a digital single-lens reflex camera with an interchangeable lens, the camera which is an optical apparatus according to the second embodiment of the present invention.

An acceleration sensor 1 and an angular speed sensor 2 detect an acceleration and an angular speed of a blur in the optical-axis direction. The displacement calculation portion 3 obtains a displacement of a blur in the optical-axis direction on the basis of outputs of the acceleration sensor 1 and angular speed sensor 2.

Figure 11:
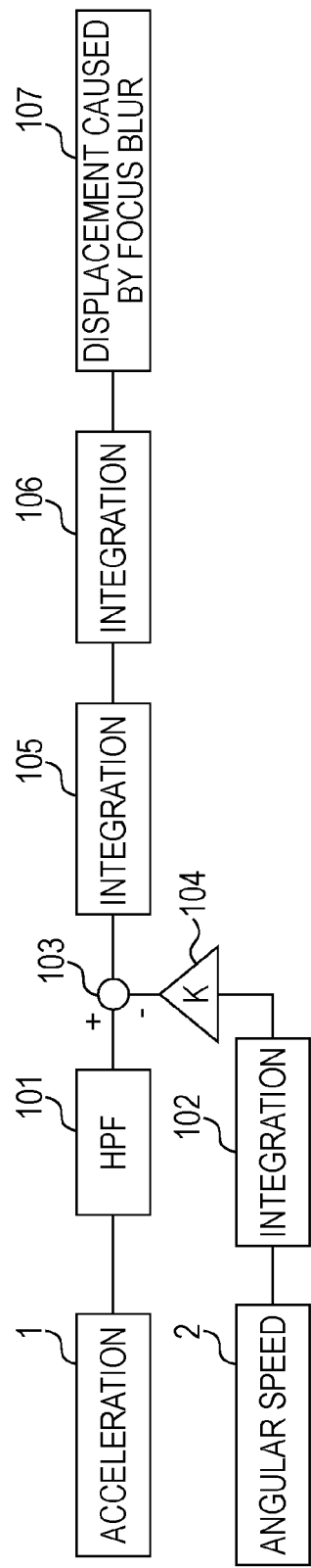
FIG. 11 is a block diagram schematically showing a way to obtain the displacement of a blur in an optical-axis direction according to the second embodiment of the present invention.

FIG. 11 is a block diagram showing a way to obtain the displacement. The output of the acceleration sensor 1 is passed through a high pass filter 101, so as to eliminate an electrical DC component and a steady acceleration component of gravity.

The output of the angular speed sensor 2 is applied to an integrator 102, and a slight displacement in a direction of the acceleration of gravity is obtained using the output integrated value. A multiplier 104 multiplies the displacement by a predetermined value (K), and a subtracter 103 subtracts the acceleration after passing through the high pass filter 101 by the multiplied value. In this way, an acceleration from which the acceleration component of gravity was completely eliminated can be obtained. Then, integrators 105 and 106 apply second-order integration to the obtained acceleration, to obtain a displacement 107 of a blur in the optical-axis direction.

Referring back to FIG. 10, an angular speed sensor 21 detects an angular speed in the direction orthogonal to the optical axis, in a pitch direction, and in a yaw direction. A shift blur angle calculation portion 22 eliminates a DC component from an output of the angular speed sensor 21, and integrates the output, to calculate an angle of a blur in the direction orthogonal to the optical axis.

A shift blur control portion 23 outputs a driving signal to a shift blur correction unit 24 corresponding to a signal from the shift blur angle calculation portion 22. The shift blur correction unit 24 drives a correction lens corresponding to the driving signal from a shift blur control portion 23, to correct an angular blur in the direction orthogonal to the optical-axis direction.

An image position correction portion 18 corrects positional shifts among images if the image temporarily stored in the image storage portion 17 is a plurality of images.

FIG. 12 schematically illustrates image combining. It is assumed that three images (a), (b), and (c) are obtained with the operation of SW2. As described above, the camera of the second embodiment has the motion blur optical correction unit configured to correct an angular blur in the direction orthogonal to the optical axis. However, an angular blur may be still remained because it is not sufficiently corrected, or the position of an object may be slightly shifted in the images because of a shift blur. If these images are simply combined, the combined object image may blur as shown in part (d) of FIG. 12. To avoid this, the image position correction portion 18 corrects the positional shifts among the plurality of images. With this correction, a combined image with minimized blur can be obtained as shown in part (e) of FIG. 12.

FIG. 13 is a flowchart showing an operation of the second embodiment. Steps similar to those of the flowchart in FIG. 6 showing the operation of the first embodiment refer step numbers similar thereto.

When a user half presses the release switch 4 (S002), correction of a shift blur is started (S020). The focal position detection portion 7 detects a focal point, and the AF control portion 8 drives the AF motor disposed in the focus unit 9 accordingly.

The AF motor drives the focus lens, and the lens is stopped at a target position so that the object is in the in-focus state. The focal position detection portion 7 detects a focal point again, and if the focal point is in the in-focus state, the AF processing is completed (S003).

Then, an image-capturing magnification is obtained on the basis of the position of the focus lens determined by the AF processing, and it is judged whether current image-capturing is macro image-capture or not, on the basis of the obtained image-capturing magnification (S021).

If the macro image-capturing is not performed, normal image-capturing is performed which is not particularly described in this specification (S022). The image recording portion 20 stores the captured image in the nonvolatile storage device (S018).

If it is judged that macro image-capture is performed in step S021, the storage portion 11 stores an output of the displacement calculation portion 3 at the completion of the AF processing (S004).

Also, the focus-range setting portion 12 determines the focus range within which the object is assumed to be in the in-focus state, on the basis of the object distance, focal length and aperture value, which are optical information at the completion of the AF processing (S005).

When the user fully presses the release switch 4 (S006), the in-focus state judgment portion 13 judges whether an object is currently in the in-focus state (S007).

If the object is not judged as in the in-focus state, it is judged whether the unfocused state has been continued for a given time or more (S014). If the unfocused state has not been continued for the given time or more, the processing returns to the step S007 and the judgment is made again.

If the unfocused state has been continued for the given time or more, the processing goes to unfocused state processing. If it is judged that the object is in the in-focus state in step S007, an exposure is started (a mirror is moved up and a shutter is opened) (S008).

The in-focus state judgment portion 13 judges whether the object is in the in-focus state during the exposure (S009). If the in-focus state is continued, it is judged whether the exposure time has reached a predetermined exposure time set with the shutter speed setting portion 5 (S012).

The exposure is continued if the exposure has not been continued for the exposure time, whereas the exposure is completed (the mirror is moved down and the shutter is closed) if the exposure has been continued for the predetermined exposure time (S013).

If it is determined that the object is not within the focus range in step S009, the exposure is completed (the mirror is moved down and the shutter is closed) (S010). Then, it is judged whether the exposure time has reached the predetermined exposure time set with the shutter speed setting portion 5 (S011). If the exposure time has not reached the predetermined exposure time, the processing returns to step S007.

If the total counted exposure time reaches the predetermined exposure time set with the shutter speed setting portion 5, or if the unfocused state processing is finished, it is judged in step S016 whether a plurality of images have been acquired by a single operation of SW2. The image storage portion 17 temporarily stores the acquired images.

If the image stored in the image storage portion 17 is only a single image, the processing goes to step S018, and the image recording portion 20 stores the image in the nonvolatile storage device.

If it is judged that the image stored in the image storage portion 17 is a plurality of images in step S016, the processing goes to step S023, and the image position correction portion 18 corrects positional shifts among the images.

Then, the image combination portion 19 combines the images with the positional shifts corrected (S017). The image recording portion 20 stores the image generated in step S017, in the nonvolatile storage device (S018). After the processing of step S018 is completed, the image temporarily stored in the image storage portion 17 is deleted.

Unfocused state processing is similar to that of the first embodiment, and the description thereof is omitted. The embodiments of the present invention are described above, however, the present invention is not limited thereto and various modifications can be made.

For example, the mirror may not be moved up and down when the exposure is started and completed. The mirror may be moved up in response to the operation of SW2, and the mirror may be moved down when image-capturing is completed. As an alternative a half silvered mirror which does not move may be used.

The motion blur optical correction unit does not have to be used for correcting the angular blur in the direction orthogonal to the optical axis: the motion blur electronic correction unit may be used by itself.

The motion blur electronic correction unit does not have to be used for correcting the shift blur. The shift blur may be corrected with the motion blur optical correction unit only, as long as the acceleration sensor or the like detects the shift blur.

The determination of the macro image-capture may not only rely upon the image-capturing magnification during image-capturing. A macro mode switch or the like may be provided, so that the user can select the macro mode.

The unfocused state processing can be possibly performed in five ways as follows. Either one of the five ways can be performed, or an optimum one can be selected depending on an image-capturing condition such as a shutter speed, or an image-capturing mode.

1) Perform the unfocused state processing 1, the unfocused state processing 2, and the unfocused state processing 3 in sequence.

2) Perform the unfocused state processing 2, the unfocused state processing 1, and the unfocused state processing 3 in sequence.

3) Perform the unfocused state processing 1 and the unfocused state processing 3 in sequence.

4) Perform the unfocused state processing 2 and the unfocused state processing 3 in sequence.

5) Perform only the unfocused state processing 3.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An optical apparatus including a lens system having a focus lens and an image pickup element which converts an image formed by the lens system into an image signal, the apparatus comprising:

a control unit configured to control operation of the apparatus;

an auto-focus unit configured to move the focus lens to bring the image into an in-focus state;

a displacement detection unit configured to detect a displacement of the optical apparatus in the direction of the optical axis of the lens system;

a displacement calculation unit configured to calculate a displacement amount of the optical apparatus in the direction of the optical axis of the lens system based on the output from the displacement detection unit;

an image pickup time setting unit operable to set a predetermined total image pickup time corresponding to one or more of the parameters: aperture size, focal length, and the position of the object to be captured;

an image combination unit configured to combine a plurality of the image signals obtained with the image pickup element;

an image position correction unit configured to correct positional shifts among the plurality of images before the plurality of images are combined;

a storage unit configured to store the displacement amount calculated by the displacement calculation unit in the in-focus state; and a focus-range setting unit configured to calculate an acceptable range of the displacement amount within which it is assumed that the image remains in an in-focus state based on a focal length, and an object distance obtained on the basis of the position of the focus lens in the in-focus state, wherein the image pickup element is operable to pick up a plurality of object images until a total image pickup time controlled with the control unit reaches the predetermined total image pickup time set with the image pickup time setting unit, and the image combination unit is operable to combine the plurality of image signals obtained with the image pickup element and to generate a single image; and wherein the control unit is operable to capture one or more images in a given time period from the pickup element only when the displacement amount calculated by the displacement calculation unit is within said acceptable range.

2. The optical apparatus according to claim 1, wherein the focus-range setting unit is operable to calculate an acceptable range of detected displacement based on the parameters: aperture size, focal length, and the position of the object to be captured.

3. The optical apparatus according to claim 1, wherein the control unit is operable, if the output of the displacement detection unit is not within the acceptable range for a predetermined time after an image pickup start switch is operated, to cause the focus lens to be driven to a position where the focus lens is focused on the object on the basis of the output of the displacement detection unit.

4. The optical apparatus according to claim 1, further comprising:

an acceleration detection unit configured to detect an acceleration of the optical apparatus in the optical-axis direction, wherein the displacement detection unit is operable to obtain the displacement of the optical apparatus in the optical-axis direction by applying a calculation to an output signal of the acceleration detection unit.

5. The optical apparatus according to claim 4, wherein the acceleration detection unit is operable to detect the acceleration and angular speed of the optical apparatus, and the displacement detection unit is operable to detect the displacement in the optical-axis direction based on at least one of the detected acceleration and angular speed.

* * * * *